: 3,574,531
STRONTIUM EXTRACTION PROCESS
Wallace W. Schulz, Richland, Wash., assignor to the United States of America as represented by the United States Atomic Energy Commission
No Drawing. Filed May 15, 1969, Ser. No. 825,073
Int. Cl. C22b 59/00; C01f 11/00, 17/00
U.S. Cl. 23—18　　　　　　　　　　　　　　　　7 Claims

ABSTRACT OF THE DISCLOSURE

A process for recovering strontium and lanthanide rare earth values from an aqueous nuclear reactor fuel reprocessing waste solution containing these and other values by adjusting the pH, adding a buffering agent and a complexing agent, which will complex all cations present except the alkali and alkaline earth metals, to the waste solution and contacting the aqueous feed solution so obtained with an organic extractant consisting of di(2-ethylhexyl) phosphoric acid and dibutyl butyl phosphonate in a hydrocarbon diluent, whereby the strontium and lanthanide rare earth values are extracted.

CONTRACTUAL ORIGIN OF THE INVENTION

The invention described herein was made in the course of, or under, a contract with the United States Atomic Energy Commission.

BACKGROUND OF THE INVENTION

The processing of uranium-containing nuclear reactor fuel which has been bombarded with neutrons to recover the unused uranium and plutonium using tributyl phosphate in the so-called Purex process results in an acidic aqueous waste solution containing essentially all of the fission products associated with the fuel.

Recovery of some or all of these fission products is important for two reasons. Some of these fission products have rather long half-lives, such as $Sr^{90}$ which is 28 years. Recovery of these long-half-life fission products is necessary so that storage times for these waste solutions need not be for a longer period than is absolutely essential to safety. In addition, many of these fission products, such as $Sr^{90}$, are desirable as a source of beta radiation for use in medicine, or as a source of heat for use in long-acting thermoelectric power supplies.

$Sr^{90}$ and many of the other fission products in the reactor fuel reprocessing waste solutions are presently recovered from these acidic waste solutions essentially as described in assignee's U.S. Pat. No. 3,154,500, issued to G. Jansen, Jr., et al. on Oct. 27, 1964. As described in the patent, extraction is accomplished by adjusting the pH of the solution to between 5 and 6, adding ethylenediaminetetraacetic acid (hereinafter referred to as EDTA) to the solution to form a feed solution in which all the cations are complexed except the alkali and alkaline earth metal values and contacting the feed solution with di(2-ethylhexyl) phosphoric acid (hereinafter referred to as D2EHPA) and tributyl phosphate (hereinafter referred to as TBP), whereby the calcium, strontium, part of the sodium and a small fraction of the lanthanide rare earths are extracted into the organic extract phase, while the remaining sodium, most of the lanthanide rare earths, iron, lead, zirconium, niobium, cesium and ruthenium are retained in the aqueous waste solution. After additional processing steps, the strontium values are separated from the other values by adsorption upon an ion exchange resin.

The TBP which is added to the D2EHPA in the organic extractant acts as a synergist, that is, the total extractive effect of the two compounds used together in greater than the effect of either compound alone. It has been found, however, that the TBP has been found to be susceptible to damage by radiation and this damage affects its extraction powers and thus greatly decreases the synergistic effect and the ability of the organic extractant to remove the strontium and other values from the aqueous feed solution.

SUMMARY OF THE INVENTION

I have found that by using dibutyl butyl phosphonate (hereinafter referred to as DBBP) in place of TBP with D2EHPA in a normal paraffin hydrocarbon (NPH) diluent containing 97 weight percent of $C_{10}$ to $C_{14}$ straight chain hydrocarbons, the synergistic effect of the organic compounds is substantially increased so that the recovery of strontium values from an aqueous feed solution is improved. I have also found that an irradiated extractant containing DBBP has the same extraction power as an unirradiated extractant containing TBP. The improvement in the extraction process comprises adding DBBP to the D2EHPA in NPH before contacting the organic extractant with the aqueous feed solution. The strontium and other values are then extracted into the organic phase and can then be further processed as described in the above-mentioned patent or by another similar process.

It is therefore one object of this invention to provide a process which will provide for improved extraction of strontium and lanthanide rare earth values from aqueous feed solutions.

It is another object of this invention to provide an improved process for extracting strontium from aqueous feed solutions which is less affected by irradiation than processes currently in use.

DESCRIPTION OF THE PREFERRED EMBODIMENT

These and other objects of the invention can be obtained by preparing a feed solution from the aqueous acidic waste solution by adjusting the pH of the waste solution with NaOH from 3 to 5, and adding 0.2 M hydroxyacetate as a buffering agent to maintain pH control. A complexing agent such as trisodium N-hydroxyethylethylenediamineacetate ($Na_3HEDTA$) or citric acid is added in a concentration of from about 0.18 M to 0.25 M to complex the undesirable inert cations such as Fe, Al, Cr and Ni which are present to prevent their extraction. The feed solution is then contacted at ambient temperature with an organic extractant which is a solution of 0.01 to 0.3 M dibutyl butyl phosphonate (DBBP) and about 0.3 M di(2-ethylhexyl) phosphoric acid in a normal paraffin hydrocarbon (NPH). Upon separation of the aqueous and organic phases, the strontium, the lanthanide rare earths and some calcium and sodium values are found in the organic phase. By contacting the extractant with a dilute nitric acid scrub solution at pH 2–3 the sodium values are removed. Further contact of the organic extractant with a nitric acid scrub at a pH of 1–2 will remove the strontium values. These values may then be further purified if so desired by passing through an exchange column.

The normal paraffin hydrocarbons used in the process contained 97 w./o. of $C_{10}$ to $C_{14}$ straight chain hydrocarbons. It has a specific gravity of 0.74 to 0.76 at 60° F. and has a flash point of 155 to 160° F.

Two synthetic feed solutions having slightly varying compositions were made up to test the effectiveness of the organic extractant.

TABLE I

| Component: | Concentration, M | |
|---|---|---|
| | 1AF-2 | 1AF-3 |
| Na | 1.51 | 1.3 |
| Fe | 0.072 | 0.15 |
| Al | 0.036 | 0.039 |
| Cr | 0.014 | 0.015 |
| Ni | 0.0072 | 0.0074 |
| La | 0.0024 | 0.0018 |
| Ce | 0.0012 | 0.0018 |
| Sr | 0.0009 | 0.0006 |
| Ca | 0.0006 | 0.0006 |
| Hydroxyacetate | 0.20 | 0.20 |
| N-hydroxyethylethylenediamine-acetate | 0.18 | 0.25 |
| Tartrate | 0.014 | 0.025 |
| $NO_3^-$ | 1.14 | 1.3 |
| $SO_4^-$ | 0.079 | 0.11 |
| pH | 3.5 | 4.0 |

A number of examples were run to compare the effectiveness of no organophosphorus compound and the synergistic effects of TBP and DBBP in 0.3 M D2EHPA in NPH. The organic extractant was contacted with an equal volume of feed solution 1AF-2, as shown in Table I. The results are given in Table II.

TABLE II

| Organophosphorus compound[1] | | Strontium extraction $E_a°$ | |
|---|---|---|---|
| Name | Concentration, M | pH 3.35[2] | pH 3.4[3] |
| None | | 2.33 | 2.9 |
| TBP | 0.01 | | 3.48 |
| | 0.05 | | 3.90 |
| | 0.1 | 3.38 | 3.99 |
| | 0.2 | 2.97 | 3.91 |
| | 0.3 | 2.91 | 3.42 |
| | 0.6 | 1.68 | 2.16 |
| DBBP | 0.01 | | 3.43 |
| | 0.05 | | 4.79 |
| | 0.1 | 4.65 | 4.82 |
| | 0.2 | 4.08 | 4.95 |
| | 0.3 | 3.23 | 4.01 |
| | 0.6 | | 1.83 |

[1] All extractants were also 0.3 M D2EHPA in NPH prepared from as received reagents.
[2] Determined with 1AF-2 (Table I).
[3] Determined with 1AF-2 adjusted to slightly higher pH than shown in Table I.

It can be seen from the above table that the use of DBBP resulted in a substantial improvement over the use of TBP with D2EHPA. The table also shows that a concentration of DBBP of from 0.01 to 0.3 M gives quite acceptable results, although a concentration of about 0.1 M to 0.2 M is to be preferred. The gradual decrease in strontium extraction at TBP and DBBP concentrations greater than 0.2 M is ascribable to increased interaction between D2EHPA and TBP or DBBP. This interaction is so strong at sufficiently high (greater than 0.45 M) concentrations of TBP and DBBP that the strontium distribution ratio is less than it is for D2EHPA alone.

An important problem in the extraction of strontium and other values from the reprocessing waste solutions is the deleterious effect of irradiation on the organic compounds being used. The D2EHPA extractant is expected to receive radiation at the rate of about 10 to 20 watt-hr./liter per solvent extraction cycle with processing feeds prepared from Purex acid waste solution. The principal effect of solvent radiolysis is a decrease in the strontium extraction capacity of the solvent. The following series of examples show the effects of radiation on D2EHPA-TBP and D2EHPA-DBBP extractants by contacting the extractants with equal volumes of the aqueous feed solutions.

TABLE III

| Solvent property | TRP Solvent[1] | | DBBP Solvent[2] | |
|---|---|---|---|---|
| | Unirradiated | Irradiated | Unirradiated | Irradiated |
| D2EHPA, M | 0.303 | 0.290 | 0.309 | 0.296 |
| Sr $E_a°$ Extraction: | | | | |
| 1AF-2 | 2.97 | 1.45 | 4.08 | 2.44 |
| 1AF-3 | 8.89 | 5.32 | 11.1 | 7.29 |

[1] A 0.303 M D2EHPA-0.2 M TBP-NPH extractant, prepared from as-purchased reagents, was irradiated 59 hours at 25° C. at 1.77 megarad/hour.
[2] A 0.309 M D2EHPA-0.2 M DBBP-NPH extractant, prepared from as-purchased reagents, was irradiated 70 hours at 25° C. at 1.66 megarad/hour.

The results in Table III show, for example, that the strontium distribution ratio obtained with a D2EHPA–TBP extractant falls by about a factor of two when the extractant is irradiated to about $10^8$ rads.

Substitution of DBBP for TBP in a D2EHPA extractant does not prevent the radiolytic decrease in strontium distribution ratio. However, the greater synergistic effect of DBBP over TBP on strontium extraction remains after prolonged irradiation. Thus, the results in Table III show, the strontium distribution ratio for a D2EHPA–0.2 M DBBP extractant, even after irradiation to about $10^8$ rads, is only slightly, i.e. about 18%, lower than that obtained with an unirradiated D2EHPA–0.2 M TBP extractant.

As can be seen, the replacing of the TP with DBBP in the D2EHPA in NPH extractant makes a substantial improvement in the ability of the extractant to remove strontium values both before and after substantial quantities of irradiation.

It will be understood that the invention is not to be limited to the details given herein but that it may be modified within the scope of the appended claims.

The embodiments of the invention in which an exclusive property or privilege is claimed are defined as follows:

1. A process for recovering strontium and lanthanide rare earth values from an aqueous waste solution containing these and other values comprising: adjusting the pH of the aqueous waste solution to between 3 and 5; adding a buffering agent and a complexing agent, which will complex all cations present except the alkali and alkaline earth metal values, to said solution thereby forming a feed solution; contacting said feed solution with an organic extractant of di(2-ethylhexyl) phosphoric acid and dibutyl butyl phosphonate in a normal paraffin hydrocarbon solution containing 97 weight percent of $C_{10}$ to $C_{14}$ straight chain hydrocarbons whereby the strontium, lanthanide rare earth and some sodium and calcium values are taken up by the extractant, separating the organic extractant from the aqueous feed solution and recovering the strontium and the lanthanide rare earth values from the organic extractant.

2. The process of claim 1 wherein the pH is adjusted with NaOH.

3. The process of claim 2 wherein the buffering agent is 0.2 M hydroxyacetate.

4. The process of claim 2 wherein the complexing agent is trisodium N-hydroxy-ethylethylenediamineacetate or citric acid.

5. The process of claim 4 where the concentration is 0.18 to 0.25 M.

6. The process of claim 4 wherein the organic extractant contains about 0.3 M di(2-ethylhexyl) phosphoric acid and from 0.18 to 0.25 M dibutyl butyl phosphate.

7. The method of claim 6 wherein the strontium values are separated from the organic extractant by first contacting the extractant containing these and other values with a dilute nitric acid solution having a pH between 2 and 3 whereby the Na values are removed, then contacting the said extractant with a dilute nitric acid solution having a pH of between 1 and 2 whereby said strontium values are removed and separating said strontium values from said dilute acid solutions.

References Cited

UNITED STATES PATENTS

| | | | |
|---|---|---|---|
| 3,154,500 | 10/1964 | Jansen et al. | 23—25UX |
| 3,047,601 | 7/1962 | Johnson | 23—23X |
| 3,302,993 | 2/1967 | Bray | 23—23 |

OTHER REFERENCES

Manning "Canadian Journal of Chemistry," vol. 40, 1962, pp. 1684–1689.

HERBERT T. CARTER, Primary Examiner

U.S. Cl. X.R.

23—19, 22, 23, 24, 25, 102, 312